(No Model.)

J. C. SHEPHERD.
VEHICLE SPRING.

No. 598,445. Patented Feb. 1, 1898.

WITNESSES
INVENTOR

UNITED STATES PATENT OFFICE.

JOHN C. SHEPHERD, OF TILSONBURG, CANADA.

VEHICLE-SPRING.

SPECIFICATION forming part of Letters Patent No. 598,445, dated February 1, 1898.

Application filed September 17, 1897. Serial No. 652,011. (No model.)

*To all whom it may concern:*

Be it known that I, JOHN C. SHEPHERD, a subject of the Queen of Great Britain, residing at Tilsonburg, in the Province of Ontario and Dominion of Canada, have invented certain new and useful Improvements in Vehicle-Springs and Vehicles provided with such Springs; and I do hereby declare the following to be a full, clear, and exact description of the invention, such as will enable others skilled in the art to which it appertains to make and use the same.

My invention relates to vehicle-springs; and it consists of a single ring of steel bent into a perfect circle and having one of its ends formed with an eye or other attaching means outside of the circumference of the circle and its other end formed with a tongue or other attaching means inside the circumference of the circle, by which latter it is fastened to the running-gear of a vehicle; and it also consists of a vehicle constructed with a set of springs of the construction above described properly connected together, as will be hereinafter described and specifically claimed.

The object of my invention is to produce a spring which is very simple in construction, light, durable, cheap, and very easy in operation.

Figure 1:
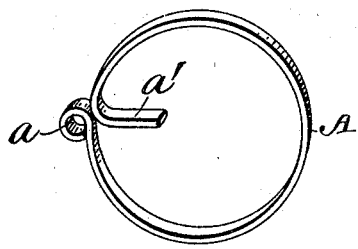
Figure 2:
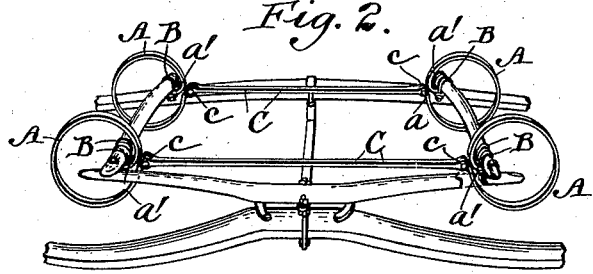
Figure 3:
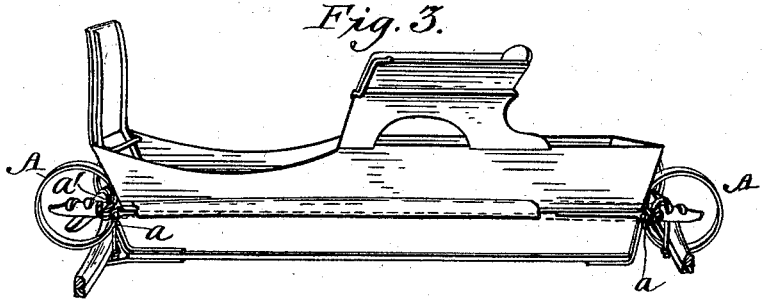
Figure 4:
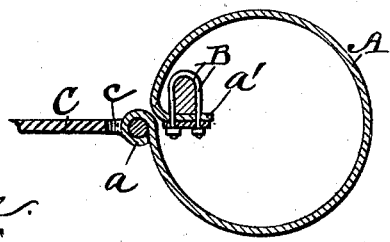

In the accompanying drawings, Figure 1 is a perspective view of my improved spring for vehicles. Fig. 2 is a perspective view of a set of my improved ring-springs applied on the side-bars of a vehicle. Fig. 3 is a perspective view of the same applied on the head-block and rear axle lengthwise of the same; and Fig. 4 is a vertical section through one of the springs, showing the mode of attachment to the gear of a vehicle.

A in the drawings represents my improved ring-spring for vehicles, which comprises in its construction a single piece of spring-steel of suitable width and thickness, which is bent into the form of a perfect circle and its ends brought closely together and then one end turned outward to form an attaching-eye $a$ and its other end turned inward to form an attaching-tongue $a'$, as shown. Four of these springs thus constructed are employed on a vehicle. The springs are attached to the side-bars, as shown in Fig. 2, or to the head-block and rear axle lengthwise of the same, as shown in Fig. 3, by means of clips B, of ordinary construction, secured on the running-gear, and the tongue $a'$, slipped into the clip, and the whole held in position by nuts in the usual manner. The other ends of the springs are connected to the straps or bars C by means of bolts passing through the eyes $a$ on the spring-rings and through apertured lugs $c$, formed on the connecting-bars C, so as to form a hinge connection between said connecting straps or bars and the ring-springs, the straps or bars being rigidly secured to the body of the vehicle.

The ring-springs, consisting simply of rings of steel, in addition to being very simple in construction are very light, the four ring-springs used on an ordinary one-horse vehicle weighing only about eight pounds. At the same time great strength is secured. The rings being a true circle the strain is equally distributed over the entire length of the circumference of the rings, there being no short bends to break under a sudden jar, as is the case with other forms of torsional springs, and when the springs are connected together there is no possibility of their extending beyond their elastic limit, for the reason that the connecting-bars hold them in parallel lines when the strain is being applied. It is impossible for the ring-springs to straighten out, and it is practically impossible to break them under any fair strain, as the whole length of the circumference is springing as a relief for the fastening, the place where the spring is most liable to break, if at all. By connecting ring-springs to the running-gear of the vehicle with a hinged connection at the corners of the body of the vehicle each of the springs works in direct opposition to each of the wheels of the vehicle without regard to any of the other wheels or springs. By this construction it is possible to ride over uneven roads without jolts or jerks. It will also be observed that by my construction of ring-springs they are able to spring back past their natural form in the same line as when they are strained and do not pitch the passenger when going over crossings, culverts, and the like.

The springs can be constructed very cheaply, as the same results can be secured from eight pounds of spring-steel rolled into rings of my construction and applied to vehicles that is now obtained from thirty pounds of elliptical springs or sixty pounds of side springs.

My improved ring-spring will be found much more effective, simpler, and cheaper than known constructions of spiral or coil springs.

I have shown two ways of applying the springs; but I do not wish to confine myself to these two ways, as the springs may be applied in any other suitable manner.

Having now described my invention, what I claim as new, and desire to secure by Letters Patent, is—

1. A vehicle-spring constructed of a single piece of steel and formed into a perfect circle comprising a single coil, the ends of which are formed with attaching means, the portions of the spring adjoining the attaching means being brought approximately together equidistant from the center of the circle, the attaching means on one end of the spring extending outside of the circumference of the spring and the attaching means on the other end of the spring extending within the circumference of the spring, the construction and arrangement being such that the bars of a vehicle are adapted to be secured to the attaching means on the outside of the circumference of the spring and the attaching means on the inside of the circumference of the spring to be secured to the running-gear of the vehicle, substantially as described.

2. A vehicle-spring constructed of a single piece of steel and formed into a perfect circle comprising a single coil, one of the ends of which is formed with an attaching-eye which extends outside of the circumference of the spring, and the other end formed with a tongue which extends within the circumference of the spring, the portions of the spring adjoining the attaching means being brought approximately together equidistant from the center of the circle, the construction and arrangement being such that the bars of a vehicle are adapted to be secured to the attaching-eye and the attaching-tongue to be secured to the running-gear of the vehicle, substantially as described.

3. A vehicle provided with wheels and a suitable running-gear and four ring-springs, each spring comprising a single piece of steel, formed into a perfect circle and having one of its ends bent into an attaching means which is outside the circumference of the circle and formed into an attaching means, bars connecting the attaching means on the outside of the circumference of the spring-rings to the body of the vehicle, the attaching means on the inside of the circumference of the spring-rings being attached to the running-gear of the vehicle, substantially as described.

4. A vehicle provided with wheels and a suitable running-gear and four ring-springs, each spring comprising a single piece of steel, formed into a perfect circle and having one of its ends bent into an attaching-eye which is outside the circumference of the circle, and its other end extended inward within the circumference of the circle and formed into a tongue, connecting bars or straps secured at one end to the eye-attaching portions by a hinged connection, and secured at their other ends to the body of the vehicle, the tongue-attaching portions of the springs being suitably secured to the running-gear of the vehicle, substantially as described.

In testimony whereof I hereunto affix my signature in presence of two witnesses.

JOHN C. SHEPHERD.

Witnesses:
FREDERICK POLLARD,
THOMAS WILLIAM DOBBIE.